Oct. 29, 1968  M. SCHWARTZ ET AL  3,408,139
AUTOMATIC SOUND SLIDE PROJECTOR
Filed Oct. 26, 1966  9 Sheets-Sheet 2

INVENTORS
MORRIS SCHWARTZ, WERNER K. BENDER,
WILLIAM CASTEDELLO, EDWARD K. KAPRELIAN
BY Hane and Nydick
ATTORNEYS

INVENTORS
MORRIS SCHWARTZ
WERNER K. BENDER
WILLIAM CASTEDELLO
EDWARD K. KAPRELIAN

BY

ATTORNEYS

Oct. 29, 1968   M. SCHWARTZ ET AL   3,408,139
AUTOMATIC SOUND SLIDE PROJECTOR
Filed Oct. 26, 1966   9 Sheets-Sheet 9

FIG. 34

United States Patent Office 3,408,139
Patented Oct. 29, 1968

3,408,139
AUTOMATIC SOUND SLIDE PROJECTOR
Morris Schwartz, Werner K. Bender, and William Castedello, Plainville, Conn., and Edward K. Kaprelian, Joppa, Md., assignors to The Kalart Company Inc., Plainville, Conn., a corporation of New York
Filed Oct. 26, 1966, Ser. No. 589,643
18 Claims. (Cl. 353—15)

ABSTRACT OF THE DISCLOSURE

A sound slide projector for projecting still pictures and playing back sound recorded on magnetic tape, or recording sound on such tape. The projector has a casing for a plurality of cartridges, each including a picture to be projected and a magnetic tape from which sound is to be played back or on which sound is to be recorded. The casing has a stationary base plate including a discharge slot and a plurality of compartments movable with reference to the base plate and each accommodating one of the cartridges. Stepwise movement of the compartments brings successive cartridges into registry with the discharge slot to permit dropping of the cartridges into the presentation position. Each cartridge is returned from the presentation position into the respective compartment upon completion of a presentation. The sound projector has an optical projecting system for projecting the picture in a cartridge in the presentation position and a sound system for reproducing sound from the tape of the respective cartridge, or recording sound on such tape. A first drive mechanism steps the casing into successive positions for releasing cartridges and a second drive mechanism winds the tape from a starting position in the cartridge toward the end position. The tape is rewound into its starting position by a cartridge spring which is loaded during winding of the tape by the second drive mechanism and is released when the winding of the tape into a predetermined position is completed. A sound head is pivoted into and out of a position coacting with the tape by a sound head moving mechanism. A cycling mechanism operates the sound head moving mechanism in a predetermined sequence and time relationship.

---

The present invention relates to a projector for projecting a sequence of still pictures and audible reproducing sound records each associated with one still picture. More particularly, the invention relates to a sound slide projector for projecting still pictures in the form of framed photographic transparencies commonly referred to as slides and sound recordings on magnetic tape supported on a common holder or cartridge.

There are known sound slide projectors which comprise a projecting unit and sound unit structurally and physically separated from each other. The sound to be audibly reproduced with projectors of this kind may be magnetically recorded on a suitable carrier such as tape, wire, a disc coated with magnetic material, or a disc bearing a spirally grooved sound track. The two units may be and are frequently functionally coupled in that upon completion of a playback of the recording a signal is transmitted by the sound unit to the projecting unit causing the latter to advance a new slide into position for projection.

Two-unit apparatus of this kind have the disadvantage that they must be carefully set up for each presentation of slides and physically separated associated sound record carriers and that they require considerable space and synchronization of their separate functions. The slides and the sound record carriers must be synchronized so that each slide is functionally associated with the correct sound record carrier. This is time consuming. Moreover, practical experience shows that confusion between slides and the appropriate sound record is not infrequent, or that the sound record carrier belonging to a specific slide is lost.

It is an object of the invention to provide a novel and improved sound slide projector in which a projecting assembly and a sound reproducing assembly are structurally and functionally combined.

It is also an object of the invention to provide a novel and improved sound slide projector which is ready for projection and audible reproduction of sound without requiring setting up of the projection assembly and of the sound assembly for each presentation, which requires less space than conventional apparatus having a separate projection assembly and sound assembly, and eliminates all danger of wrongly combining slides and sound records, or losing either a slide or a sound record constituting in combination a presentation of picture and sound.

Another object of the invention is to provide a novel and improved sound slide projector which is capable of automatically presenting a succession of slides each accompanied by associated playback of sound.

Still another object of the invention is to provide a novel and improved sound slide projector which accepts a plurality of cartridges each containing a slide and a record carrier in the form of magnetic tape or wire and which automatically triggers an advance from cartridge to cartridge upon completion of a presentation of picture and sound.

A further object of the invention is to provide a novel and improved sound slide projector which includes as part of the apparatus convenient and simple repeat control means for repeating the presentation of the slide and the associated sound record in selected cartridges.

It is also an object of the invention to provide a sound slide projector according to the invention with equipment for recording sound on the sound record carrier contained in the afore referred to cartridges.

Still another object of the invention is to provide a novel and improved cartridge including a slide support and a magnetic tape support and suitable for use in a sound slide projector according to the invention.

Still another object of the invention is to provide a novel and improved sound slide projector which accepts a plurality of cartridges each containing a slide and a record carrier in the form of magnetic tape or wire and which, in addition, automatically controls one or several further operations, for instance silent slides by means of a second or slave slide projector in such a way that the sound slide projector and the second slide projector function in the manner of a "master and slave team."

Other and further objects, features and advantages of the invention will be pointed out hereinafter and set forth in the appended claims constituting part of the application.

In the accompanying drawing a preferred embodiment of a projector according to the invention and of a cartridge according to the invention, are shown by way of illustration and not by way of limitation.

Referring now to the figures more in detail and first to FIGS. 1–4, the exemplified apparatus according to the invention comprises a lower housing which is composed of a base 42 and a surrounding part 43. Parts 42 and 43 may be made of any suitable material such as molded plastic. Part 43 supports a horizontally disposed annular plate 44 which is continued at its inner periphery by a generally frusto-conical part 45 extending downwardly to base 42 and preferably resting upon the same. Annular plate 44 is unbroken except for a generally radial slot 46. The surface area of plate 44 should be as smooth as possible and may be covered with a layer 47 which is wear resistant and has a low friction coefficient for a purpose which will be explained more fully hereinafter. An inner part of a suitable bearing 48 such as a ball bearing or a roller bearing rises from the center of base part 42 as can best be seen in FIG. 3.

Housing 41 accommodates a diagrammatically indicated conventional projecting system 49 including a focusing lens 51 (FIG. 2) for projecting an image of a slide 50 in the direction of an arrow 52. The image of the slide should be visualized as being projected upon an external screen (not shown) in a conventional fashion.

Lower housing 41 supports an upper housing 55 formed by an outer wall 56, an inner wall 57, a cover 58 and a bottom 59. The upper housing defines a generally annular shape 60 accommodating a drive mechanism 61 for the apparatus and electronic equipment 62. The electronic equipment should be visualized as being generally conventional. It may include a pre-amplifier 63, a power supply 64, controls 65, a VU meter 66, volume and tone controls 67 and 68 and one or several loudspeakers 69.

Drive mechanism 61 which will be more fully described hereinafter is diagrammatically indicated in FIG. 1. Its principal components are a drive motor 70, a transmission 71 coupling the motor to a capstan 112 on carriage 72, a magnetic head assembly 73 which may include one or several sound heads for playback or recording and an erase head, and a mechanism 74 for positioning a cartridge 90 in a presentation position and withdrawal from such position respectively, as will be more fully explained hereinafter. Components 70, 71, 72, 73 and 74 are all mounted on an annular platform 75 which is supported between outer wall 56 and bottom 59 of upper housing 55 as can best be seen in FIG. 3. Lower housing 41 and upper housing 55 further accommodate a rotatable assembly 80. This assembly comprises a lower support section 81 journalled upon bearing 48 on base 42, an upper support section 82, a cartridge carrier or drum 83 for a supply of cartridges 90, top cover 84 and a side cover 85.

Components 81 to 85 all have a circular cross-section and are joined to each other in a rigid unit terminating in an outer bearing member 86 at the lower end of section 81 and a smooth peripheral rim 87 at the lower end of cover 85. Several circumferentially spaced rollers 88 at the juncture of inner wall 57 of upper housing 55 and cover 58 support the entire assembly 80 at rim 87.

Figure 1:
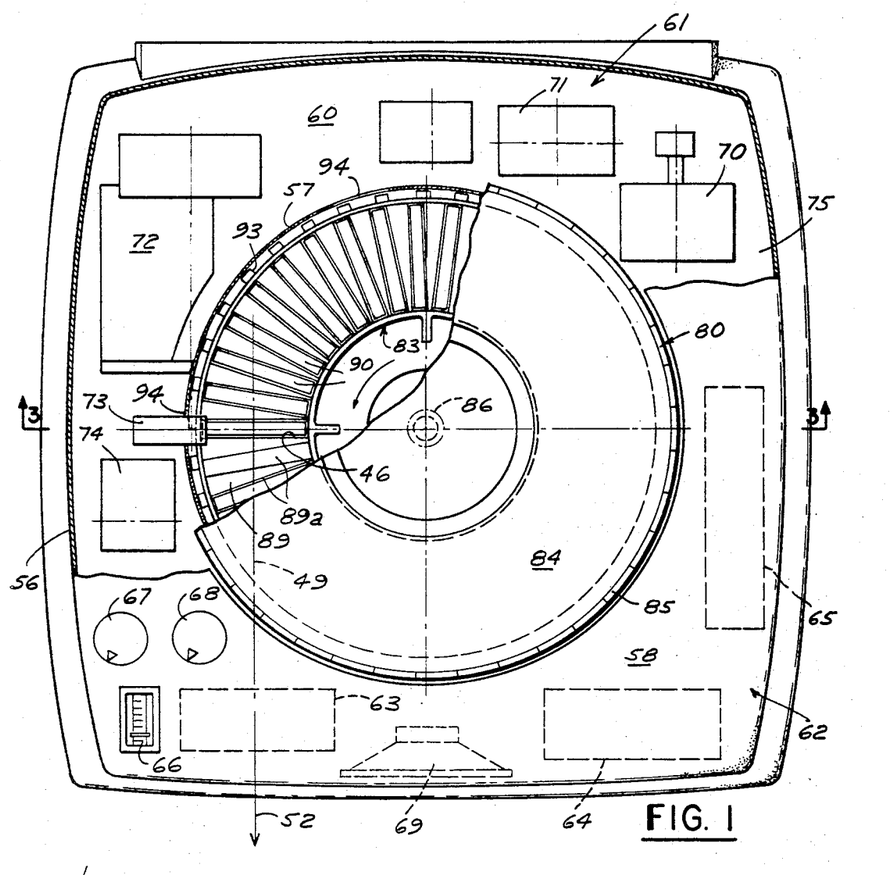
FIG. 1 is a plan view of a projector according to the invention, partly in section.
Figure 3:
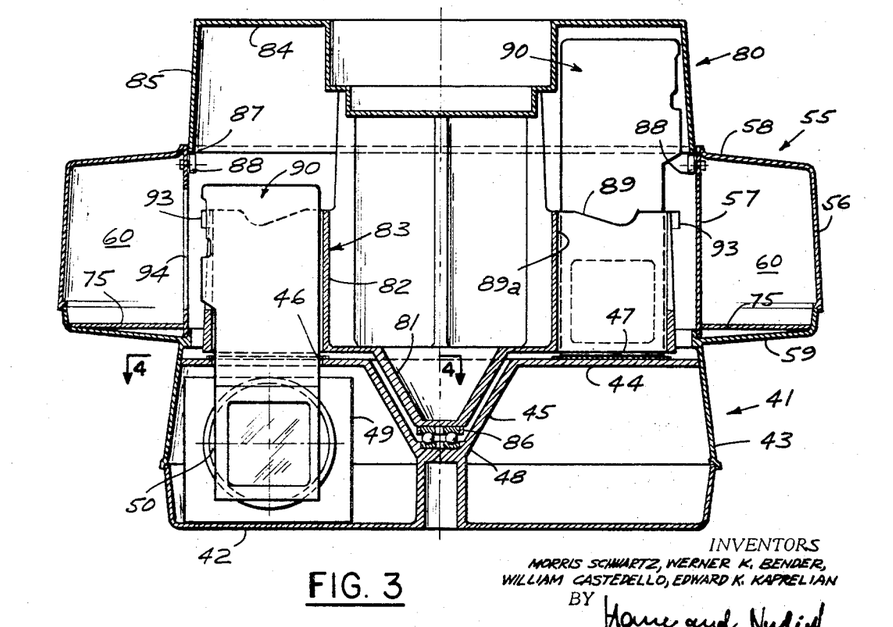
FIG. 3 is an elevational view of FIG. 1 taken on line 3—3.
Figure 4:
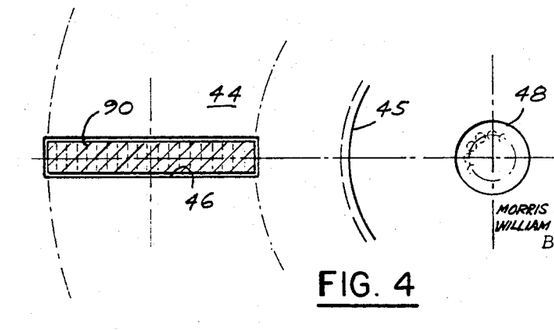
FIG. 4 is a fragmentary plan view, partly in section, taken on line 4—4 of FIG. 3.

Cartridge carrier or tray 83 which is preferably a molded body, has a plurality of radial partition walls 89 which define within the carrier thirty-seven radially disposed generally rectangular compartments 89a open at the top and the bottom as can best be seen in FIGS. 1 and 3. Cover 85 is marked on its outside with numerals 91 reading "0" and "1–36". The numerals are positioned to be placed selectively or successively in registry with a marker 92 on cover 85 to index the cartridges within carrier 83. Compartments 89a associated with numbers 1–36 are all filled with cartridges when the cartridge carrier is fully loaded. The numeral "0" constitutes a starting position as will be more fully explained hereinafter. The right hand side of FIG. 3 shows a cartridge 90 in the carrier. Such position of the cartridges will be hereinafter sometimes referred to as the upper or transport position of a cartridge. As previously stated the cartridge carrier is open at the top and the bottom. The top opening of the carrier serves to load or empty the carrier and the bottom opening to permit movement of a cartridge from its upper position into its lower or presentation position in which it is shown on the left hand side of FIG. 3. The presentation position of a cartridge is the one in which the cartridge is ready for projection and playback. Movement of a cartridge from its upper position into its lower position is effected in the exemplified apparatus by gravity and more specifically by moving the cartridge carrier 83 from the position in which numeral "0" is in registry with marker 92 into a position in which any one of the compartments 89a is in registry with slot 46 in plate 44.

Rotation of cartridge carrier 83 is effected by engagement of a turning mechanism hereinafter to be more fully described, with radially projecting ribs 93 on the outside wall of the carrier. Thirty-seven ribs are provided in accordance with the afore-pointed out thirty-six compartments, numbered 1 to 36 and the starting position numbered "0."

In this connection, it should be mentioned that obviously the cartridge carrier may be designed for a smaller or greater number of cartridges. Moreover, movement of the cartridge from its transport position in the carrier into its presentation position may be effected by suitable and conventional transport means such as linkage, magnetic force, etc. rather than by gravity.

CARTRIDGE FOR PICTURE AND SOUND CARRIER

Turning now to FIGS. 29-32, these figures show a cartridge 90 suitable for use in the apparatus in accordance with the invention. Broadly the exemplified cartridge comprises a support for a slide 50 such as a framed photographic transparency and a support for magnetic tape 195 to be wound from a starting position to an end position and automatically returning into its starting position. Playback of sound recorded on the tape or recording of sound on the tape is effected while the tape is being found from its starting position to its end position. Drive of the tape toward its end position is effected by capstan 112 and return of the tape into its starting position by spring action.

More specifically, the cartridge comprises a case 90 having a frame structure 91a for receiving slide 50 and a case portion 91b for receiving a tape mechanism 263. Portion 91a is closed by a cover 260 and portion 91b by a cover 261 to secure the slide and the tape mechanism respectively, in position. The covers may be held by suitable fastening means 262 such as screws. Instead of providing a cover 260 for securing the slide the same may also be retained by ears extending from casing 91a and an extension of cover 261.

The tape mechanism comprises a drum 265 rotatably supported on case portion 91b. The drum has along its periphery two axially spaced grooves or sheaves 264 and 270. Instead of a double sheave drum two separate superimposed peripherally grooved drums or wheels may, of course, also be used. Tape 195 is suitably attached at 266 to sheave 264 and is wound an appropriate number of times about the drum. The tape is then passed around guide pulleys 267, 268 and 269 to sheave 270 in which it is attached at 271 after winding the tape several times about the sheave.

Pulley 269 is supported by an arm 272 pivotal about a post 273. The arm is biased/clockwise by a spring 274 to apply tension to the tape so that the same is held taut and straight between pulleys 267 and 268 but is able to yield when the straight tape section is deformed by the pressure of sound heads 193 and 194, capstan 112 and a pressure idler 197 as can best be seen in FIG. 30. A slot 275 in case portion 91b or cover 261 receives a projection 276 of pulley 269 to limit the possible swing of arm 272.

Drum 265 has fixedly secured thereto a drum 280. Drums 265 and 280 are both secured to a shaft 281 for supporting the drums freely rotatable on case portion 91b as previously described. A leaf spring 283 is secured at 282 on drum 280 constituting a take-up drum. The spring is extended from drum 280 to a storage drum 284 which is rotatable on a post 285 secured to case portion 91b. As can best be seen in FIGS. 32 and 33, rotation of tape drum 265 and drum 280 in counter-clockwise direction will wind the spring 283 from storage drum 284 upon out-put drum 280. The spring is so biased that release of the spring will cause rewinding of the same upon storage drum 284 thereby rotating 280 and tape drum 265 in clockwise direction. The turns of the spring on both out-put drum 280 and storage drum 284 are always tautly pressed together. The only free part of the spring is a straight section thereof between the two drums. The length and the tension of this straight spring section remain substantially unchanged during the entire winding and unwinding operation of the spring. Accordingly, the spring will continuously have, in contrast to conventional clock or watch springs, a substantially constant torque while being wound or unwound. Such constant torque springs are known in the art and available in the market under the trademark "Negator" spring. Accordingly, capstan 112 driving the tape will always drive against a substantially constant spring force thereby assuring a substantial constant tape speed during playback or recording which, as is well known, is highly desirable in sound reproducing equipment. However, it should be understood that the invention is not limited to the use of a constant torque spring, but that rewind of the tape may be effected by any other suitable instrumentality, conventional or not conventional.

Figures 29, 30A, 31, 32:
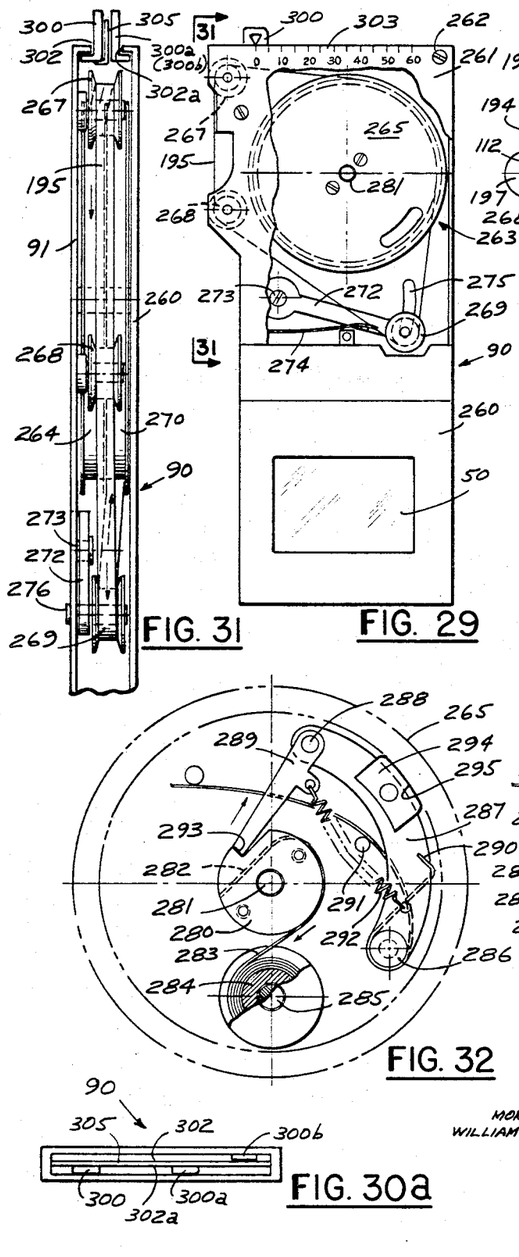
FIG. 29 is a plan view, partly broken away, of a cartridge for a sound record carrier and a still picture.
FIG. 30a is plan view of FIG. 30.
FIG. 31 is a fragmentary elevational sectional view taken on line 31—31 of FIG. 29.
FIG. 32 is a plan view of the tape carrier of the cartridge and of the mechanism for the tape carrier.

To limit the rotation of tape drum 265 by the action of spring 283 a stop and braking assembly is provided. This assembly comprises an arm 287 pivotal about a post 286 secured to case portion 91b. A second arm 289 is hinged to arm 287 at 288. A spring 290 biases arm 287 counter-clockwise against a pin 291 also secured on case portion 91b. A second spring 292 biases arm 289 counter-clockwise toward drum 280. This drum has a peripheral notching or recess 293 which is engaged by arm 289 in the rest position of the tape mechanism which is best shown in FIG. 32. Engagement of arm 289 with notch 293 prevents rotation of drum 280 and with it of tape drum 265 in clockwise direction by the action of spring 283. In addition, arm 289 when in notch 293 holds arm 287 in a position in which a brake shoe 294 of a suitable braking material secured to arm 287 is pressed against the inner peripheral wall 295 of drum 265.

Figure 30:
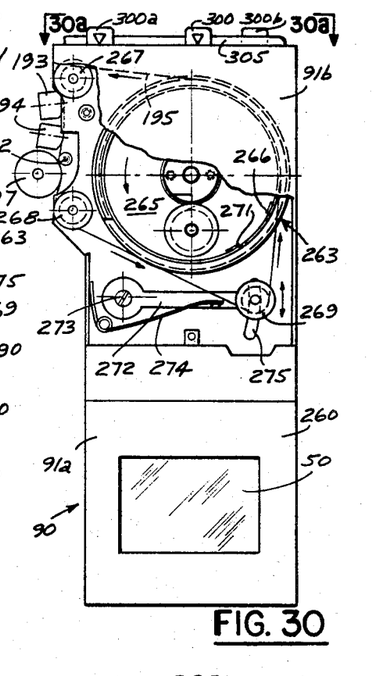
FIG. 30 is a view similar to FIG. 29 but showing the cartridge in another operational position.
Figure 33:
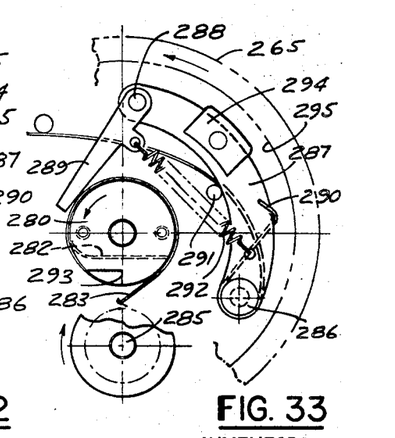
FIG. 33 is a fragmentary plan view of the tape carrier mechanism in a different operational position.

When now tape 195 is driven by capstan 112 (as will be more fully described hereinafter) in downward direction as seen in FIG. 30, the action of spring 283 is overcome and the spring is being wound upon drum 280 as seen in FIG. 33. As soon as the winding of spring 283 upon drum 280 commences, brake shoe 294 is released by the action of spring 290 and arm 289 slides out of recess or notch 293 and rides on the turns of spring 283, now forming on drum 280 as is also shown in FIG. 33.

Assuming that the capstan is disengaged from tape 195 in a manner described hereinafter upon completion of the winding from sheave 264 upon sheave 270, that is, upon completion of a playback or recording operation, spring 283 will rewind itself upon storage drum 284. Upon completion of the rewind operation, arm 289 will again engage recess or notch 293 and braking material 294 will re-engage the inner drum face. In other words, all the components are returned to the position shown in FIG. 32.

The top of cartridge case 91 mounts a tab 300 made of a suitable electrically non-conducting material such as plastic. The tab is inserted into a frictional slider 301 which can be moved by finger pressure along a slot 302. Tab 300 coacts with a scale 303 on cover 261 for setting the termination of the playback time. The scale is calibrated by way of example, at five second intervals for a maximum of one minute. The tape should have a length sufficient for a running time slightly in excess of one minute to avoid tearing of the tape.

In addition to tab 300 a tab 300a may be provided which is frictionally slidable in a second row 302a separated from row 302 by a strip 305 or similar dividing means as shown in FIG. 30a. The tab 300a may be used to control a utilization device as will be more fully explained hereinafter. A second tab 300b in row 302a may be provided to control a second utilization device or to effect a further control of the first mentioned utilization device.

MECHANISM OF APPARATUS

Figure 2:
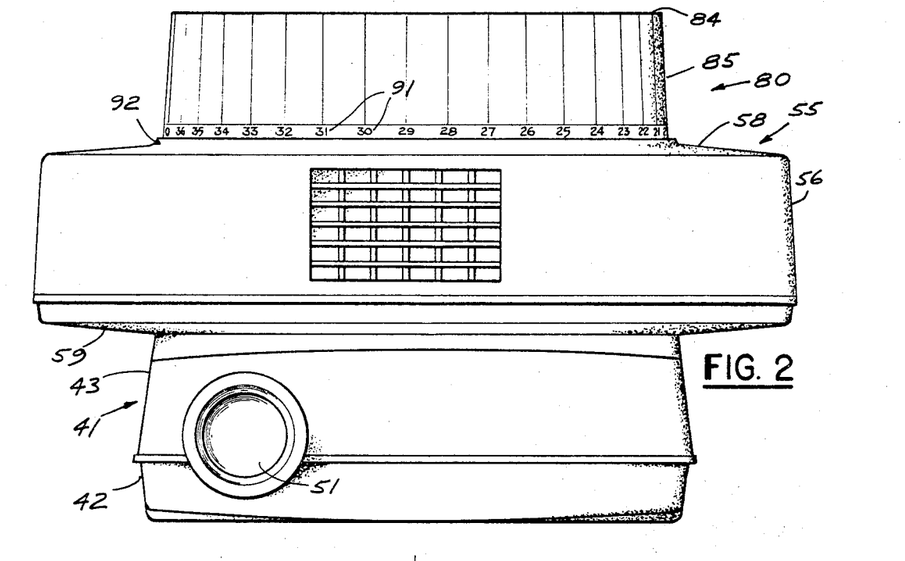
FIG. 2 is an elevational front view of FIG. 1.
Figures 5, 6, 7, 8:
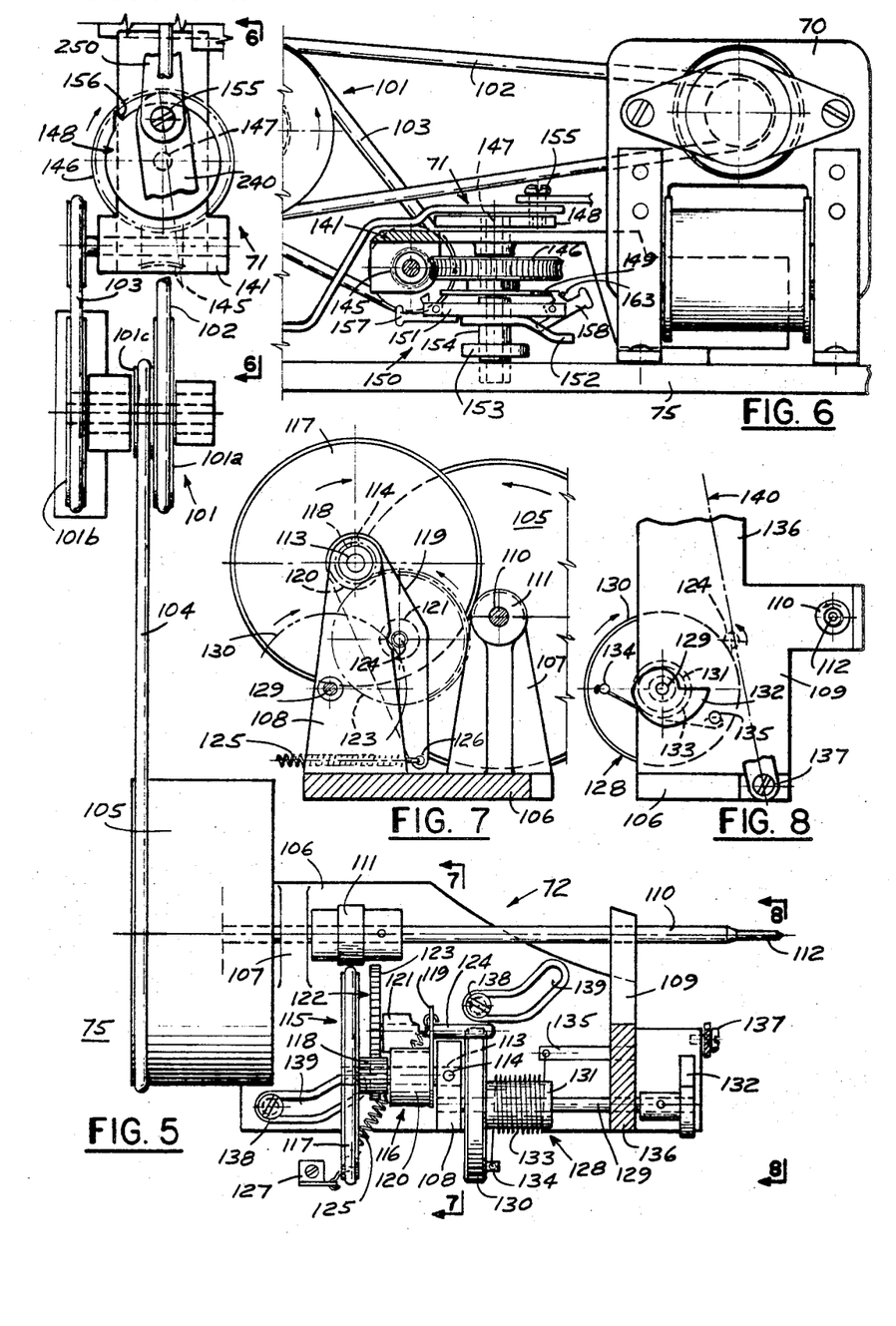
FIG. 5 is a plan view of the assembly for positioning and driving the capstan of the sound portion of the projector and of part of the assembly for positioning the sound head or heads of the projector.
FIG. 6 is a fragmentary elevational view, partly in section, taken on line 6—6 of FIG. 5.
FIG. 7 is an elevational sectional view taken on line 7—7 of FIG. 5.
FIG. 8 is an elevational sectional view taken on line 8—8 of FIG. 5.

Inner wall 57 of upper housing 55 has several cutouts or openings 94 to permit mechanical interaction between drive mechanism 61 and rotatable assembly 80 (see FIGS. 1, 2 and 3). Referring to FIGS. 5, 6, 7 and 8, sheave 101a of a fixed sheave assembly 101 is driven by motor 70 via a belt 102. This drive is transmitted via a second sheave 101b of assembly 101 and a belt 103 to transmission assembly 71 and via a third sheave 101c and a belt 104 to a flywheel 105 constituting part of capstan carriage 72. The capstan carriage is mounted on a base 106 from which rise three uprights 107, 108, and 109. Upright 107 supports a rotary shaft 110 which seats flywheel 105, a friction wheel 111 and capstan 112. Upright 108 mounts a shaft 113 which is suitably secured against rotation in the upright, for instance by a set screw 114. Shaft 113 seats freely rotatable assemblies 115 and 116. Assembly 115 is a rigid unit including a friction wheel 117 coacting with friction wheel 111 and a pinion 118 secured to wheel 117 for rotation in unison therewith. Assembly 116 comprises a plate 119 to which bearings 120 and 121 are secured. Bearing 121 journals an assembly 122 including a gear 123 fixedly secured on a shaft 124. A spring 125 is attached to plate 119 at 126 and to platform 75 in housing 55 at 127 as can best be seen in FIG. 5. The spring biases plate 119 in clockwise direction as seen in FIG. 7.

Figures 17, 18, 19, 20:
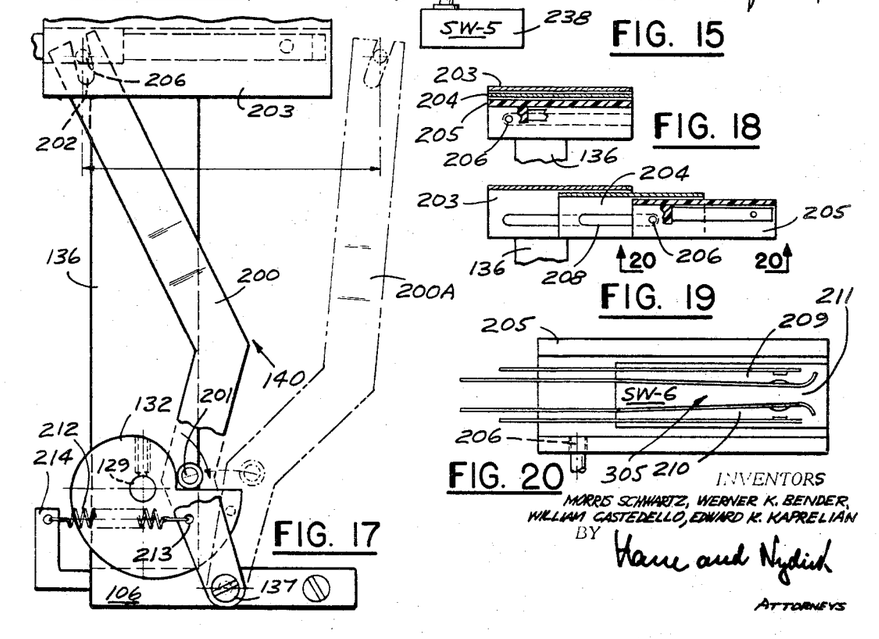
FIG. 17 is a fragmentary elevational view of part of the timing mechanism for controlling the timing of the record tape in a cartridge used in the projector.
FIG. 18 is an elevational sectional view of a control component of the timing mechanism shown in FIG. 17.
FIG. 19 is a sectional view similar to FIG. 18 but showing the control component in a different operational position.
FIG. 20 is a sectional plan view taken on line 20—20 of FIG. 19.

Uprights 108 and 109 further support a rotatable assembly 128. This assembly includes a shaft 129 mounting a friction wheel 130 coacting with shaft 124, a spring arbor 131 and a cam 132 fixed to the shaft. A coil spring 133 loosely wound about spring arbor 131 is secured at one end to a post 134 on friction wheel 130 and at the other end to a post 135 extending from upright 109. The spring biases assembly 128 in counter-clockwise direction as seen in FIG. 8. Rotation of the assembly in this direction is limited to a predetermined rest position by a mechanism 140. This mechanism comprises a fixed assembly 136 extending from upright 109 and a movable assembly including among other components to be described later on, an arm 200 pivoted to base 106 by suitable means such as shoulder screw 137 (FIGS. 8 and 17).

The capstan carriage 72 is slidably retained by shouldered screws 138 passing through angle slots 139 in base 106 and secured to platform or deck 75.

Figures 13, 14:
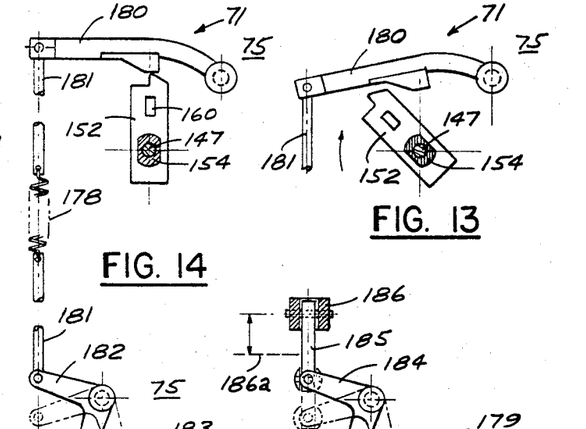
FIG. 13 is a fragmentary plan view of the mechanism for triggering the sound heads of the projector.
FIG. 14 is a further and more complete plan view of the mechanism of FIG. 13 in another operational position.

Referring now to FIGS. 5, 6, 10, 11, 12, 13 and 14, belt 103 of transmission assembly 71 drives through a worm assembly 145 in a housing 141, a worm wheel 146 and a shaft 147. This shaft supports fixedly secured thereto, a crank 148 and a toothed wheel 149. The shaft further supports freely rotatable thereon a hollow shaft 154. The hollow shaft mounts an assembly 150 rotatable in reference to shaft 147 and including a yoke 151, an arm 152 and a cam 153. Crank 148 in conjunction with a shouldered screw 155 serves as a crank arm for two linkages described hereinafter. Wheel 149 has a peripheral tooth 156 and yoke 151 mounts two rockers 157 and 158 weighted at their outer ends. When either of the rockers is turned up as it is shown for rocker 158 in FIG. 6, it will be engaged by tooth 156 as wheel 149 turns. Each of the rockers has an extension 159 which defines a rest position for the respective rocker by engagement of a cut-out 160 in arm 152 as is shown in FIG. 14.

Figures 9, 10, 11, 12:
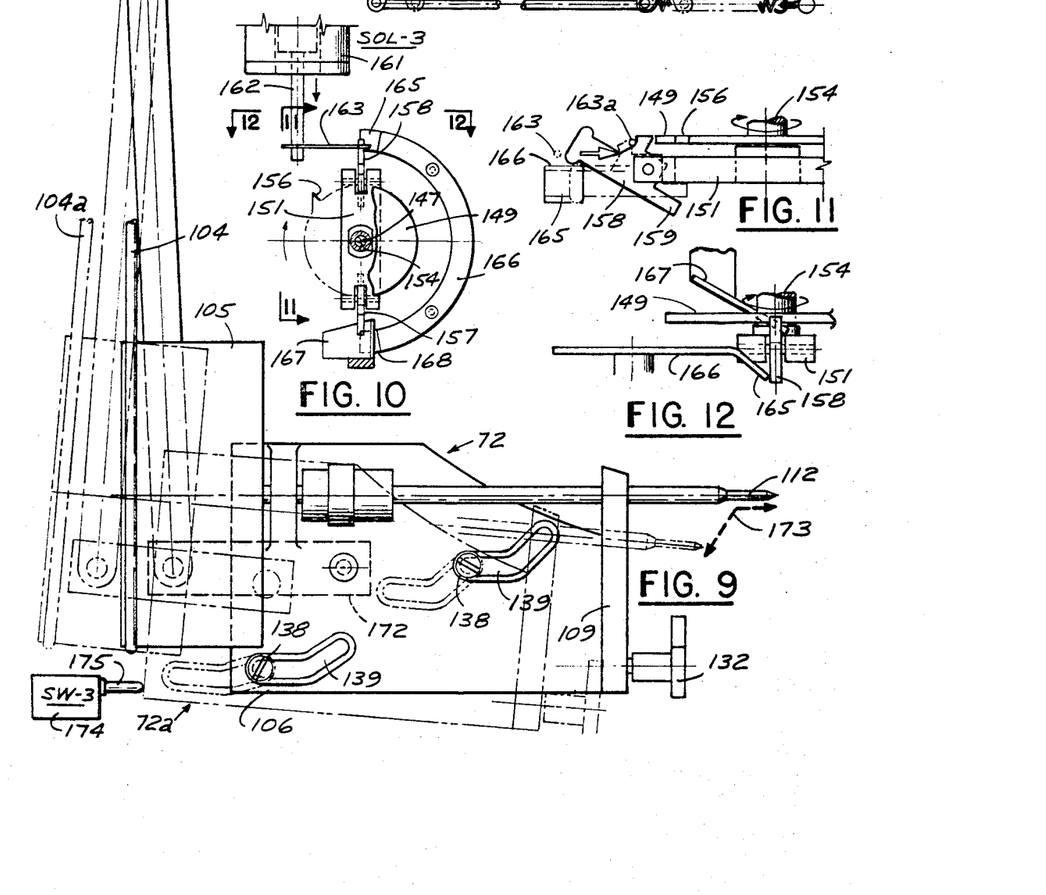
FIG. 9 is a further plan view of the assembly for driving and positioning the capstan of the sound portion of the projector.
FIG. 10 is a detail view of the mechanism for triggering the capstan movement in the capstan assembly.
FIG. 11 is an elevational view taken on line 11—11 of FIG. 10.
FIG. 12 is an elevational view taken on line 12—12 of FIG. 10.

A solenoid 161 having an armature 162 mounting a thin springy bar or wire 163 urges, when energized, the wire from its initial position into a position 163A as is indicated in FIGS. 10 and 11. In this position, the wire engages a recess or crotch in the respective rocker to turn the same as is shown in FIGS. 6 and 11 for rocker 158. The rocker when thus turned will clear the edge of an entry ramp 165 on a semi-circular guide 166. A very brief energization of the solenoid is sufficient to move the rocker into its position clearing the ramp. As a result of the clearance of the ramp by the rocker, a continued rotation of wheel 149 will carry yoke 151 along with the wheel. However, this motion of the yoke is limited to a turn of 180° as rocker 158 will drop back into its initial position when reaching an exit ramp 168. Moreover, upon completion of a 180° movement of wheel 149 the second rocker 157 will abut against entry ramp 165 thereby further restraining yoke 151 against rotation through an angle of more than 180°. To assure that the rockers do not stick in their turned-up position an upper cam 167 may be positioned parallel to exit ramp 168.

Reverting to FIG. 9 cam 153 actuates capstan carriage 72 via a linkage including an arm 170 pivoted at 171 to platform or deck 75 and a link 172 linked to arm 170. When cam 153 is in the position 153A indicated in dotted lines in FIG. 9, the capstan carriage 72 occupies the position 72A also indicated in FIG. 9 in dotted lines thereby moving the capstan into a position disengaged from tape 195 of cartridge in the presentation position. Moreover, cam 132 which constitutes part of a timing mechanism to be described hereinafter is also ineffective. The configuration of slots 139 is such that capstan 112 is compelled to move along a path 173 shown in FIG. 9.

Movement of capstan carriage 72 into the position 72A actuates a switch 174 by engaging a switching arm 175. The function of switch 174 will be described in conjunction with FIG. 35. The rotation of flywheel 105 by belt 104 is not affected by the movement of capstan carriage 72 into the position 72A, the belt being sufficiently flexible to operate equally well in position 72A.

Figure 15:
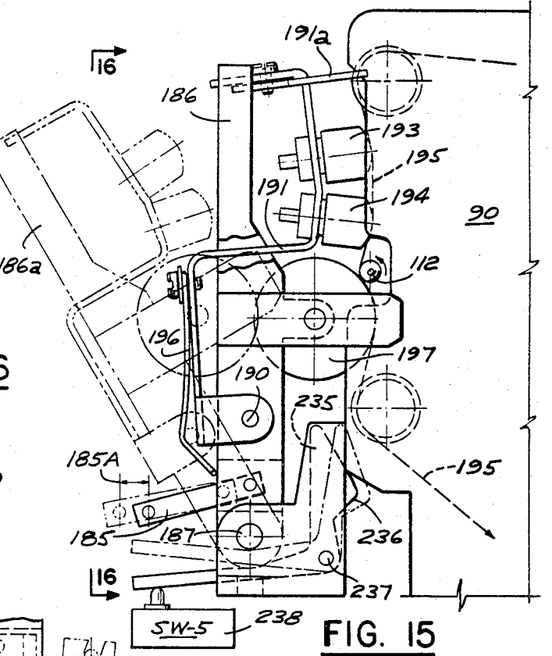
FIG. 15 is a further elevational detail view of the mechanism for positioning the sound heads of the projector.

Turning now to FIGS. 13 and 14, arm 152 shown in detail in these figures perform a cam action when being turned from the angular position of FIG. 13 into the position of FIG. 14 by rotation of hollow shaft 154 on which the arm is mounted. As a result, an arm 180 is also pivoted from the position of FIG. 13 into the position of FIG. 14 thereby moving a sound head assembly 186 from the position 186A disengaging from tape 195 as is shown in FIG. 15 in dotted lines into the position engaging the tape as also shown in FIG. 15. The pivotal movement of arm 180 is transmitted to sound head assembly 186 via a link 181, and a bell crank lever 182, a link 183, a bell crank lever 184 and a link 185, link 185 being linked to head assembly 186 as is clearly shown in FIG. 15. A spring 178 is preferably included in a convenient link of the transmission such as link 181. The spring will absorb cumulative errors or play in the transmission between assembly 186 and cam arm 152 by yielding lightly. A second, preferably comparatively soft spring 179 is provided to bias the entire transmission linkage into the phantom position as shown in FIG. 14 when arm 180 is free of engagement with cam arm 152.

Figure 16:
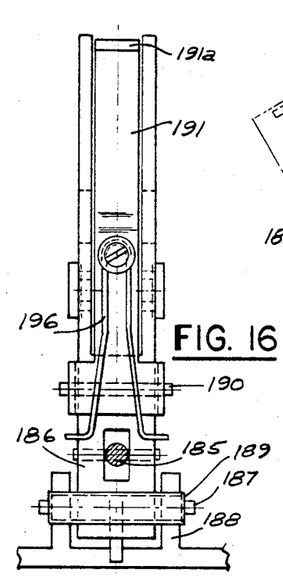
FIG. 16 is a fragmentary elevational view taken on line 16—16 of FIG. 15.

As can best be seen in FIGS. 15 and 16, head carrier 186 which is in the form of a yoke is pivotal about a preferably shouldered pin 187 which is fitted in a bearing block 188 and retained therein by suitable fastening means such as a spring clip 189. A bracket 191 is hinged to carrier 186 by a pin 190. A fork 191a secured to the upper end of the bracket aligns the same on cartridge 90 as is clearly indicated by the position of bracket 191 when shown in FIG. 15. The cartridge itself is held in its correct position by brackets 192 straddling the same. As a result sound heads 193 and 194 and a pressure roller 197 coacting with capstan 112 are correctly aligned in reference to tape 195. The pressure with which the sound heads engage the tape is determined by deformation of a spring 196 as carrier 186 is in the dotted line position 186A, that is in the position withdrawn from the tape.

Turning now to FIGS. 5, 8, 17, 18, 19 and 20 according to these figures a cam follower 201 on an arm 200 engages cam 132 thereby biasing the cam into its limiting position as previously described in connection with assembly 128.

At the top of assembly 136 extending from upright 109 as previously described, there is mounted a fixed channeled member 203 (FIG. 19) nesting a slidable channeled member 204 which, in turn, nests a slidable electrically non-conductive for instance, plastic channeled member 205. A pin mounted on member 205 extends through slots 207 and 208 in members 203 and 204 and engages an elongated recess 202 in arm 200 (FIG. 17). Member 205 further mounts normally open electric switch contacts 209 and 210. As is evident, contacts 209 and 210 move a distance equal to the displacement of pin 206 during one revolution of cam 132 causing movement of arm 200 from the full line position of FIG. 17 to the dotted line position 200A as is indicated by an arrow. As is further evident, the movement of the contacts is rectilinear. Each of the contacts has preferably an entry shoe 211 to facilitate engagement with non-metallic tabs 300, 300a and 300b on each cartridge 90 (see FIGS. 29 to 31) to force the contacts into the closed position by engagement with the tab. Contacts 209 and 210 may be connected in parallel to assure electrical connection even if tab 300 should be somewhat off-center so that only one contact is engaged and forced into its closed position. The two contacts constitute a switch 305 (SW-6) in the circuit system of FIG. 35 which will be described hereinafter.

In the event the safety feature provided by the use of two contacts is deemed to be unnecessary, only one contact such as contact 209 may be used as switch 305, the other contact 210 is then available as an auxiliary switch for controlling other operations.

The exemplified sound slide projector controlled by engagement of switch contact 209 with tab 300 of the cartridge as previously described, may constitute a master unit. Switch contact 210 suitably modified in an obvious manner may be used to control one or several utilization devices as slave units. For instance, engagement of switch contact 210 with tab 300a may be used to control as slave unit a tape recorder, a phonograph, a silent projector for still pictures, a projector for silent motion picture film etc. As is evident, engagement of tab 300b with switch contact 210 may be used to apply a second control signal to the slave unit first controlled by tab 300a, or tab 300b may be used to control a further slave unit. Circuit systems suitable for the purpose are well known in the art.

A spring 212 is preferably connected on one end to arm 200 at 213 and on the other end to a post 214 extending from base 106 as is shown in FIG. 17. The spring serves to bias arm 200 toward the full line position of FIG. 17.

Figures 21, 23, 25:
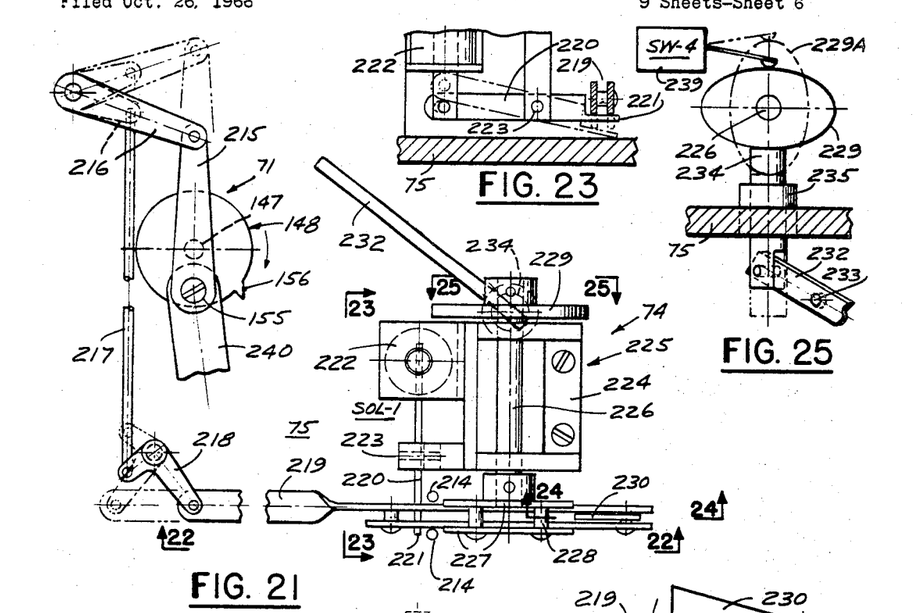
FIG. 21 is a plan view of the mechanism for lifting a cartridge from the presentation position to a transport position.
FIG. 23 is a fragmentary elevational view, partly in section, taken on line 23—23 of FIG. 21.
FIG. 25 is an elevational view, partly in section, taken on line 25—25 of FIG. 21.

As shown in FIGS. 21–26, turning of crank 148 in the direction of the arrow of FIG. 21 causes a bar 219 via a linkage including shouldered screw 155, a link 215, a bell crank 216, a link 217 and a second bell crank 218, to be displaced lengthwise between guide pins 214. This is one of the linkages previously referred to in connection with crank 148. An arm 220 pivotally supported at 223 extends on one end below bar 219 as is indicated at 221 in FIG. 21. The other end of arm 220 is linked to a solenoid 222 (SOL-1). Bar 219 will normally rest in a lower position shown in FIG. 22 in dotted lines at 219A but is raised into its full line position 219B by the action of arm 220 when solenoid 222 is energized.

Figures 22, 24, 26:
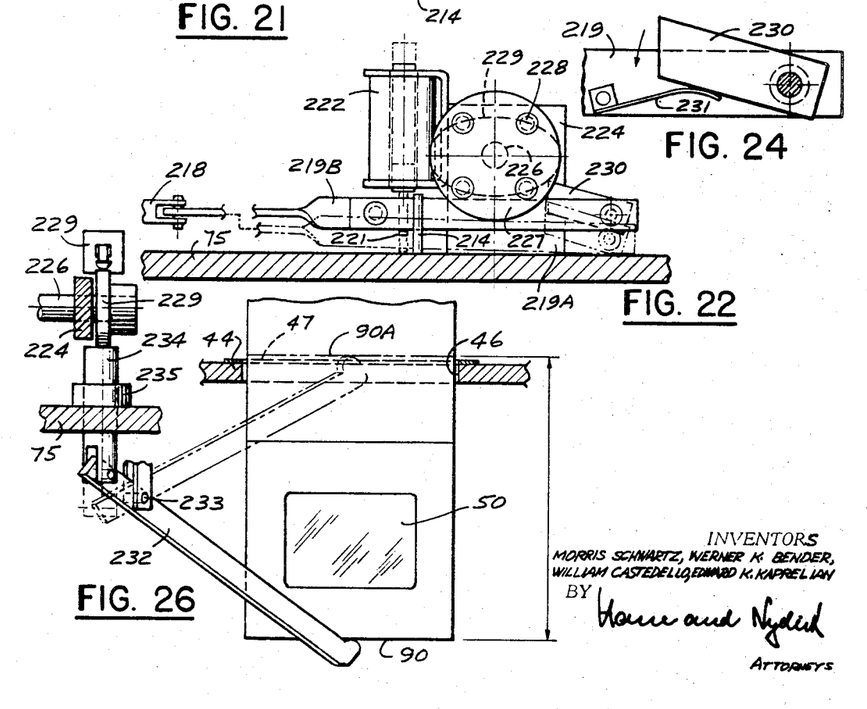
FIG. 22 is an elevational view, partly in section, taken on line 22—22 of FIG. 21.
FIG. 24 is an elevational view, partly in section, taken on line 24—24 of FIG. 21.
FIG. 26 is an elevational view of the linkage included in the cartridge lifting mechanism shown in FIG. 21.

FIGS. 21 and 22 further show a bearing support 224 mounting a rotatable assembly 225. This assembly comprises a shaft 226 one end of which mounts two alike discs 227 having thereon four ratchet pins 228. The other end of the shaft mounts a cam 229. Bar 219 has pivotally secured thereto a pawl 230 which is slightly biased by a spring 231 into the position of FIG. 24.

As is now evident, rotation of crank 148 and thus of shouldered screw 155 about shaft 147 will cause no interaction with assembly 225 when solenoid 222 is de-energized, pawl 230 being then clear of pins 228. However, upon energization of the solenoid causing lifting of bar 219 as previously described, pawl 230 will impart a quarter turn to cam 229 with each movement of screw 155 from the six o'clock position to the twelve o'clock position but will leave cam 229 in its position when moving from the twelve o'clock to the six o'clock position since pawl 230 is simply deflected by the rearmost ratchet pin 228.

A two-arm lever 232 pivotally mounted at 233 engages with its short arm a plunger 234 engageable with cam 229 and slideable in a sleeve 235 which, in turn, is mounted on platform or deck 75 as is shown in FIG. 26. The long arm of lever 233 engages the bottom of a cartridge 90 which is dropped through slot 46 from its upper position (see right side of FIG. 3) into its lower or presentation position (see left hand side of FIG. 3). Movement of lever 232 from the full line position of FIG. 26 into the dotted line position returns the cartridge from its presentation position to its rest position 90A in which the lower edge of the cartridge is slightly above the level of plate 44 thus freeing carrier 83 to turn into a position in which another cartridge is free to drop through slot 46 into its presentation position. Movement of lever 232 into its upper position is effected by the afore described turn of cam 229. This cam is in the dotted line position of FIG. 25 when lever 232 is turned up and into its full line position when the lever is down. Moreover, the position of cam 229 controls a switch 239 (SOL-4) the function of which will be explained in connection with FIG. 35.

Referring again to FIG. 15, a lever 236 pivotal about a pivot 237 is controlled by the position of cartridge 90 and controls in turn a switch 238 (SW-5) the function of which will also be explained in connection with circuit diagram of FIG. 35.

Figures 27, 28:
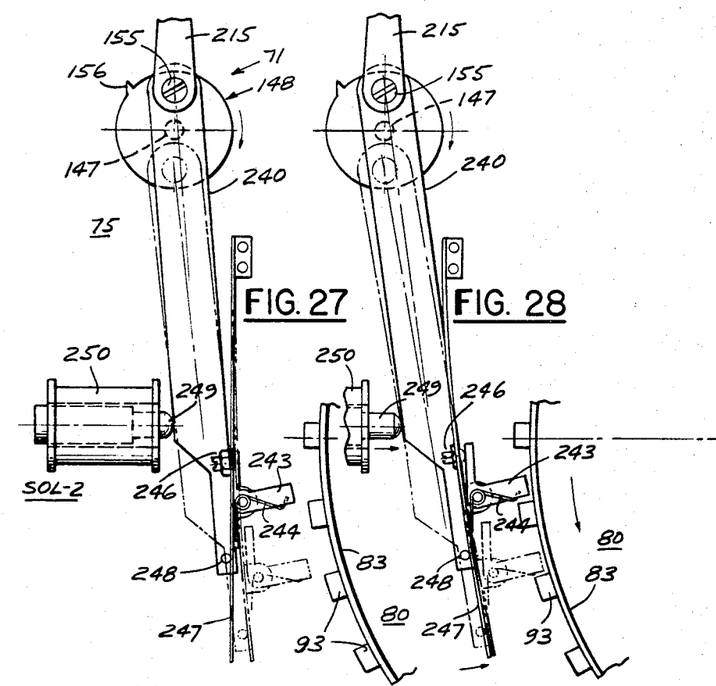
FIG. 27 is a fragmentary plan view of a mechanism for moving the cartridge receptacle of the projector.
FIG. 28 is a view similar to FIG. 27 but showing the receptacle moving mechanism in a different position.

Turning now to FIGS. 27 and 28, as is shown in these figures, screw 155 on crank 148 further mounts a link 240 pivoted thereto on one end. The other end of the arm has pivoted thereto an arm 243 which is biased by a spring 244 into a position in which an extension of arm 243 abuts a preferably adjustable stop 246. A further spring 247 bears against a pin 248 on link 240 biasing the same against a plunger 249 of a solenoid 250 (SOL-2). When the solenoid is de-energized, turning of crank 148 and its shouldered screw 155 about shaft 147 causes the linkage assembly including link 240 to move out of engagement with rotary assembly 80 and more specifically out of coaction with ribs 93 of cartridge carrier or tray 83. The linkage including link 240 is the second one of the linkages previously referred to in connection with crank 148. Upon energization of solenoid 250, as will be described in connection with the circuit diagram of FIG. 35, plunger 249 pushes link 240 toward the cartridge carrier and thus arm 243 into coaction with one of the ribs 93 on the carrier. As a result, the carrier is turned through an angle corresponding to the movement of screw 155 on crank 148 from the twelve o'clock position to the six o'clock position, said angular movement of the carrier being such that the carrier is placed in a position in which one of the cartridges in the carrier is placed in alignment with slot 46 thereby permitting such cartridge to drop into its presentation position as previously described. When screw 155 performs its return stroke, that is, when it moves from the six o'clock position to the twelve o'clock position, arm 243 is pivoted by the action of spring 244 and thus slips past ribs 93.

OPERATION OF THE APPARATUS

Figure 34:
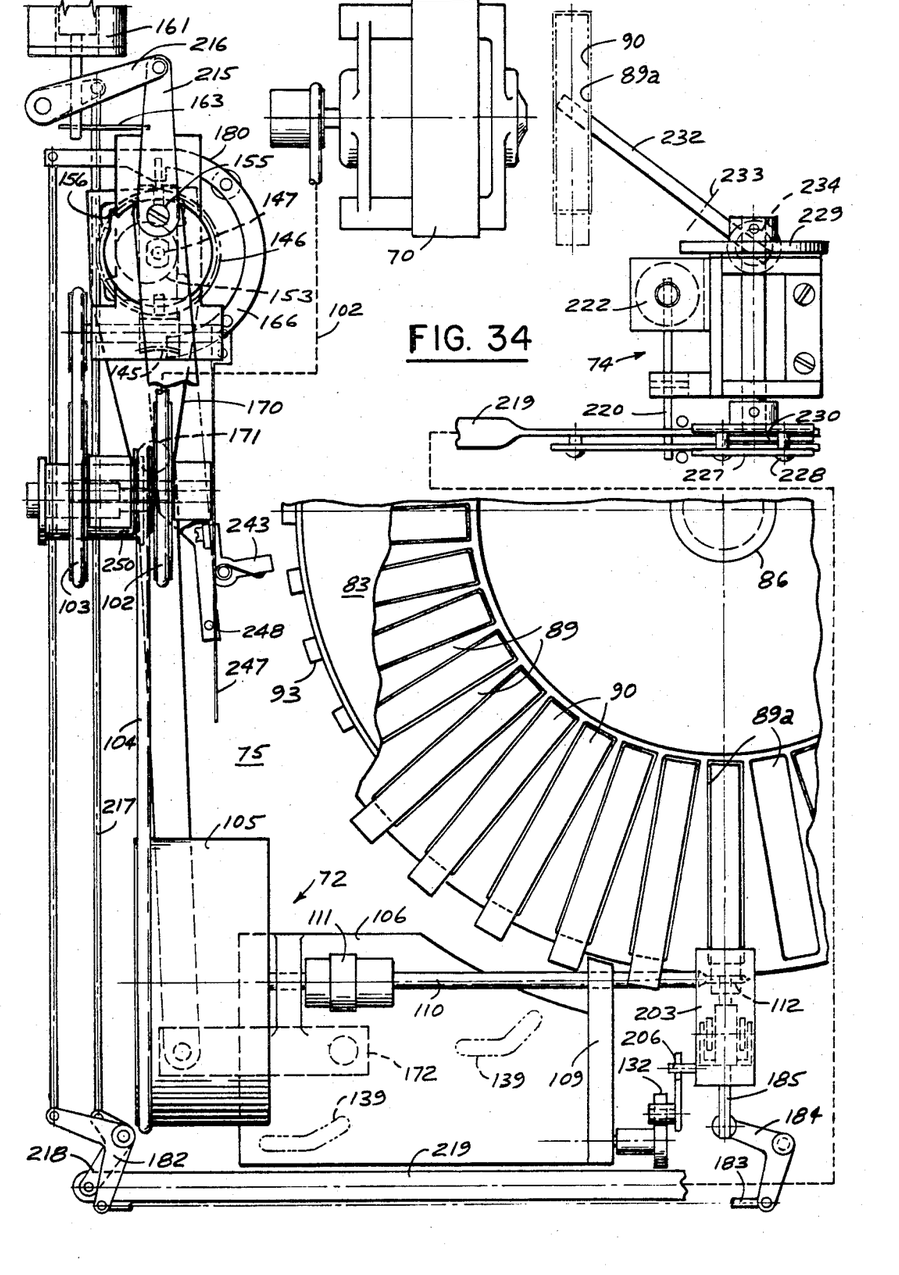
FIG. 34 is a plan view of the cartridge operating and control assemblies of the projector.

The operation of the apparatus will now be described.
With respect to assembly FIG. 34 it should be understood that the assembly 225 and all the components associated therewith are shown for reasons of space at the upper right corner of the drawing but should be visualized as being actually located at the lower right corner. As it is indicated by a dotted line the assembly 225 and its associated components are in alignment with bar 219 shown at the bottom of the figure. To facilitate further the understanding of the drawing, one of the compartments 89a is repeated in dotted lines, but it is actually one of the compartments formed in the cartridge carrier or tray 83. Similarly, motor 70 shown at the top of FIG. 34 should be visualized as being so placed that belt 102 driven by it is in alignment with the remainder of the belt shown on the left side of the figure as is also indicated by a dotted line.

Figure 35:
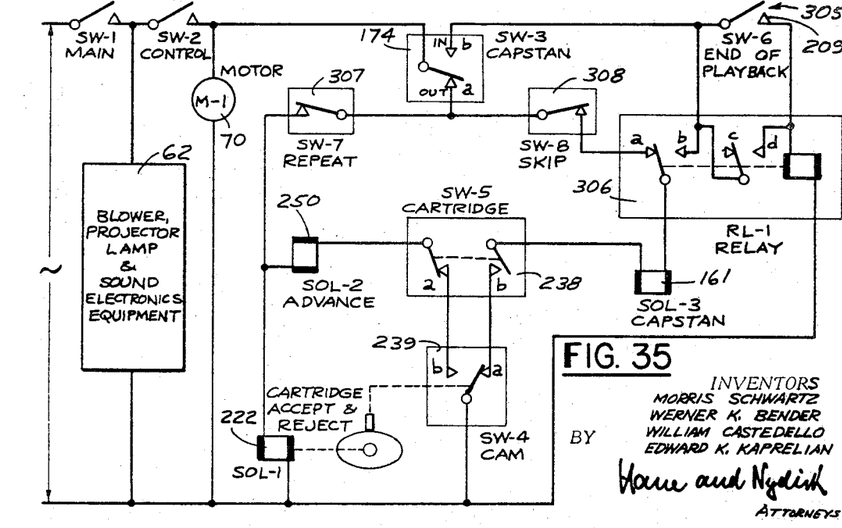
FIG. 35 is a circuit diagram of the electrical control assembly of the projector.

In the circuit diagram of FIG. 35 the solenoid designations and switch numerals used in the specification are repeated as much as possible. In addition, legends are applied to FIG. 35.

The circuit diagram shows the electric control and actuating system of the apparatus in an inactive position. To start the apparatus a main switch SW–1 is closed thereby connecting the entire system to a suitable supply of current such as the house mains. Closing of switch SW–1 activates a conventional blower (not shown), a projector lamp included in the projecting assembly 49 indicated in FIG. 1 and the sound electronics equipment also diagrammatically shown in FIG. 1. The apparatus is now ready for a presentation of successive cartridges, assuming that carrier or drum 83 has been loaded with such cartridges in a conventional and readily obvious fashion and that the carrier is in an angular position in which the starting compartment marked "0" is in alignment with slot 46 in plate 44.

To start the presentation of cartridges a control switch SW–2 is closed which initiates the following sequence of operations:

(a) Motor 70 is started and rotates shaft 147 via belt 102, sheave assembly 101, belt 103, worm 145 and worm 146. Rotation of shaft 147, in turn, drives crank 148 mounting shouldered screw 155 and also drives toothed wheel 149.

(b) Solenoid 222 (SOL–1) is energized via switch 174 (SW–3). As a result, arm 220 is turned counterclockwise causing lifting of bar 219 into its upper position (see FIGS. 22 and 23). When, now, crank 148 moves from the six o'clock position to the twelve o'clock position, lifting of bar 219 causes pawl 230 to engage one of the pins 228 on discs 227 so that cam 229 is turned through one-quarter (see FIG. 25) from the full line position to the dotted line position.

(c) As a result, switch 239 (SW–4) is switched from the a to the b position and arm 232 is pivoted upwardly from the full line position into the dotted line position of FIG. 26 due to the coaction of cam 229 with plunger 234 (see FIG. 25). Such movement of the arm has no effect upon the position of a cartridge 90 since as previously described, none of the cartridges is in the presentation position when and while carrier or tray 83 is in the "0" position.

(d) Movement of switch 239 into the b position causes energization of solenoid 250 (SOL–2). As a result, plunger 249 of the solenoid pushes link 240 toward the center of the carrier (see FIGS. 27 and 28) thereby moving arm 243 into coaction with ribs 93. Accordingly, continued turning of crank 148 from the twelve o'clock position to the six o'clock position causes turning of the cartridge carrier from the "0" position to the "1" position to the "1" position, that is, into a position, in which the first cartridge is in alignment with slot 46 in plate 44.

(e) Switch 239 remains in the b position. Accordingly, the operations listed in point (b) are repeated, that is, cam 229 is caused to make a further one-quarter turn back into the full line position. Switch 239 returns into the position shown in FIG. 35 in which the a contact is closed. Arm 232 is no longer held up by cam 229, and hence, drops into the full line position of FIG. 26 thereby permitting the cartridge in compartment No. 1 which is now in alignment with slot 46, to follow the arm by its own weight. Hence, the No. 1 cartridge moves from its position 90A in the cartridge carrier 83 into its lower or presentation position, that is, into the position shown in FIG. 3 on the left hand side.

(f) The cartridge when moving down engages and pivots lever 236 which in turn, actuates switch 238 (SW–5) as best shown in FIG. 15. Actuation of this switch opens its a contact and closes its b contact thereby energizing solenoid 161 (SOL–3).

(g) Solenoid 161 when energized, causes via its armature 162 wire 163 to move into engagement with the notch of rocker 158 thereby pivoting the rocker into the path of tooth 156 on disc 149 as is best shown in FIGS. 10 and 11. Wheel 149 is turned by shaft 147 as explained in point (a) and now carries along yoke 151 since rocker 158 is no longer arrested by the entrance end of ramp 165. Upon completion of a half turn of wheel 149 and with it of yoke 151 the second or opposing rocker 157 will abut against the end of ramp 165 thus stopping the yoke. Turning of yoke 151 causes turning of hollow shaft 154 as previously explained and with it of cam 153. The cam when turning swings arm 170 from the dotted line position into the full line position (see FIG. 9) thereby moving capstan carriage 72 into the full line position. Switch 174 is operated moving its contacts from the a position to the b position thus interrupting the connection for solenoid 222.

(h) Shaft 154 when rotating also turns arm 152 which while turning, cams arm 180 in clockwise direction (see FIGS. 13 and 14) thereby moving the head assembly 186 including heads 193 and 194 and pressure roller 197 via the linkage 181 to 185 into position for coaction with the tape 195 of the first cartridge now in the presentation position as is best shown in FIG. 15.

(i) Sheave assembly 101 driven as explained in point (a) further turns capstan 112 via belt 104 and flywheel 105. The capstan is positioned behind the tape of the first cartridge dropped into the presentation position as explained in point (g) and counter pressure roller 197 is also positioned as explained in point (h). Accordingly, the capstan will begin to wind the tape from sheave grooves 264 to sheave groove 270. At the same time spring 283 is wound from storage drum 284 upon take-up drum 280. In other words, the entire capstan carriage 72 is in play-back position. Spring 125 is under tension and the transmission of the drive between flywheel 105 and the time control cam 132 is completed via friction wheel 111, friction wheel 117, pinion 118, gear 123, shaft 124, friction wheel 130 and shaft 129 as can best be seen in FIG. 5. Post 134 on wheel 130 now winds on spring 133. Cam 132 as it turns in unison with shaft 129 causes arm 200 to pivot in the direction for moving contact 209 (or contacts 209 and 210) toward non-conducting tabs 300, 300a and 300b (see FIG. 17).

(j) As previously explained, the location of tab 300 controls the time of the play-back. Engagement of the tab with contact 209 closes switch 305 (SW–6). Closing of this switch energizes a relay 306 (RL–1) thereby causing the relay to open its a and c contacts and to close its b and d contacts. The relay thus closes a holding circuit for itself via its contact d and also energizes solenoid 161.

(k) Solenoid 161 when energized causes wire 163 to move into engagement with rocker 157 thus pivoting the same into the position in which it can clear ramp 165 as has been previously described for rocker 158. Arm 152 now turns out of engagement with arm 180 thus freeing spring 179 for withdrawing the entire linkage 181 to 185 so that the head assembly including heads 193 and 194 and the pressure roller 197 are snapped away from tape 195.

The tape is now free and hence, spring 283 is released to rewind itself upon drum 284 thereby also rewinding the tape upon sheave 264. Rotation of tape drum 265 is stopped when arm 289 re-engages notch 293 as described in connection with FIGS. 29 through 33.

In addition, cam 153 turns thereby pivoting arm 170 linked to capstan carriage 72 from the full position of FIG. 9 into the dotted line position. Capstan 112 is now free from engagement with tape 195 and spring 125 is relaxed thus easing the pressure engagement between shaft 124 and friction wheel 130. Previously wound spring 133 is thus free to return the entire assembly 120 to its starting position shown in FIG. 9 in dotted lines. Cam 132 is also returned into its starting position by spring 212 as is shown in FIG. 17 in full lines. Accordingly, spring 212 returns into its full line position of FIG. 17 thereby withdrawing arm 200 and channeled member 203 mounting contacts 209 and 210. Hence, tab 300 becomes disengaged from the contact and switch 305 is re-opened. Relay 306 remains energized via its hold circuit through contact d until the capstan has moved from the full line position of FIG. 9 into the dotted line position thereby opening the b contact of capstan switch 174 (SW–3).

(1) Movement of the capstan switch 174 from the *in* position in which contact b is closed to the *out* position in which contact a is closed re-energizes solenoid 161 thereby repeating the aforedescribed cycle except that cartridge No. 1 the presentation of which is completed, is now returned into cartridge carrier or drum 83 by the upward movement of arm 232 which was an idle movement when the cartridge carrier is turned into the position in which cartridge No. 2 is in alignment with slot 46 so that it will move into the presentation position when arm 232 is lowered. All the cartridges slide on plate 44 when the cartridge carrier is rotated in reference to the plate. The movement of the cartridges along the plate is facilitated by the aforedescribed anti-friction layer 47.

(m) In the event it is desired to hold a cartridge for one or several repeat presentations a normally closed repeat switch 307 (SW–7) is opened before a presentation in progress is completed. The cycle will then proceed as described before except that the steps of moving the cartridge carrier from one number to the next one and of dropping a cartridge into the presentation position are eliminated since solenoids 222 and 250 and switch 239 are disconnected from the circuit when and while switch 307 is open.

To restore normal cycling operation repeat switch 307 is reclosed before the last desired presentation is completed, that is the END OF PLAY-BACK, switch 305 is closed by tab 300.

(n) If it is desired to skip the presentation of one or several cartridges, a SKIP switch 308 (SW–8) is opened before the presentation in progress is completed. The cycle will proceed as described except that due to the disconnection of capstan switch 161 from the circuit the steps causing the movement of the capstan carriage into the operative position and of moving head assembly 186 into the operating position are eliminated.

In other words, the cartridge carrier 83 will simply move from position to position without releasing any of the cartridges into the presentation position. Starting of the selected cartridge is effected by reclosing SKIP switch 308 when and while cartridge carrier 83 is moving from the cartridge next preceding the selected cartridge to the said cartridge.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:
1. An apparatus for projecting still pictures and audibly reproducing magnetically recorded sound or for recording sound on magnetic tape, said apparatus comprising in combination:
  (a) a plurality of cartridges each including a support for a still picture to be projected, a rotary support for winding a magnetic tape from a starting position toward an end position and returning the tape to its starting position, and spring means coacting with said rotary tape support to bias the same for return of the tape into its starting position; and
  (b) an assembly comprising optical projecting means, sound means, positioning means for moving said cartridges, one by one, into a presentation position for coaction with said optical projecting means and said sound means or out of said position, and actuating means for actuating said rotary tape support, said sound means and said positioning means;
  (c) said sound means including a sound head, and a support means supporting said sound head movable into and out of an operational position coacting with the magnetic tape in a cartridge placed in said presentation position;
  (d) said positioning means including a movably supported casing releasably holding said plurality of cartridges in a mutually fixed relationship, a stationary picture and sound station arranged to receive a cartridge released by the casing upon movement of the latter into a predetermined release position in reference to the presentation station;
  (e) said actuating means including first drive means for moving said casing into successive positions for releasing the cartridges, one by one, to the presentation station, second drive means movable into and out of driving relationship with the tape in a cartridge in said presentation station for winding the tape from said starting position toward said end position against the action of said spring means and releasing the tape for return into its starting position by the action of said spring means, means for moving said sound head into coacting relationship with the tape when the same is in its starting position and for moving the sound head out of said position when the tape is driven toward its end position and reaches a predetermined position, cartridge return means for returning successive cartridges to the casing from the presentation station, and cycling means operable for activating the means included in said actuating means in a predetermined sequence and time relationship and said casing comprises a stationary base plate including a discharge slot disposed above said presentation station, a side wall mounted movably in reference to the base plate, and a plurality of partitions secured to said side wall for movement in unison therewith, said partitions defining a plurality of compartments one for each cartridge and each open at the bottom, and wherein said first drive means when actuated move said compartments step by step intermittently along said base plate into a position of registry with said discharge slot thereby releasing successive cartridges for transfer into the presentation station by a directional force.

2. An apparatus according to claim 1, wherein said cartridge return means comprises lifting means engaging when activated a cartridge in the presentation station to lift the cartridge through said discharge slot into a compartment in registry with said slot for movement of the cartridge in reference to the base plate upon activation of said first drive means.

3. An apparatus according to claim 1, wherein said rotatable side wall is in the form of a drum, said compartments in the drum and said discharge slot in the base plate being substantially radially disposed in reference to the rotational axis of the drum.

4. An apparatus according to claim 1, wherein said second drive means comprises a capstan, a linkage means including a movable output link supporting said capstan and a movable input link, movement of said input link in one direction causing the output link to move the capstan into driving engagement with the tape of a cartridge in the presentation station and movement of said input link in the opposite direction causing withdrawal of the capstan from the tape, and rotary transmission means coacting with said input link to effect said opposite movements thereof upon activation of the second drive means.

5. An apparatus according to claim 1, wherein said sound head moving means comprises a pivotally supported arm mounting the sound head for pivoting the same into and out of the coacting relationship with the tape of a cartridge in the presentation station, a linkage means having an input linked to said arm to effect said pivotal movement thereof and a movable output link, movement of the input link in one direction causing the output link to pivot said support arm into the position for coaction of the sound head with the tape and movement of the input link in another direction causing the support arm to withdraw the sound head from said coacting position.

6. An apparatus according to claim 1, wherein said cycling means comprise control means controlling the sequential operation of said first and second drive means, said sound head moving means and said cartridge return means, said control means when activated by operation of the cycling means first actuating said first drive means to move a cartridge into said presentation station, said activation of the first drive means causing operation of the control means to actuate the second drive means and also the sound head moving means to place said second drive means and said sound head moving means in positions respectively for driving the tape and for audibly reproducing from the tape or recording on the tape while the same is being driven, driving of the tape for a predetermined period of time causing operation of the control means to actuate the second drive means and the sound head moving means for return of said second drive means and said sound head moving means into the initial positions thereof, return of said second drive means and said sound head moving means into said positions causing renewed operation of the control means to operate the cartridge return means for returning the respective cartridge from the presentation station to the casing and said actuation of the cartridge return means causing further operation of the control means to reactivate the first drive means for moving another cartridge into the presentation station.

7. An apparatus according to claim 6, wherein said control means further comprise adjustable time control means for varying said predetermined period of time in which the driving of the tape by the second drive means is completed.

8. An apparatus according to claim 7, wherein said adjustable time control means comprise energizing circuit means coacting with said second drive means and said sound head moving means to activate the same respectively, for withdrawal from the tape driving position and coaction with the tape and with the cartridge return means to activate said means for returning the respective cartridge from the presentation station to the casing, said circuit means including switch means controlling the aforesaid activation of said second drive means, said sound head moving means and said cartridge return means, and wherein each of said cartridges mounts a switch actuating means adjustable as to position and engageable with said switch means to switch the same for the purpose aforesaid, engagement of said switch actuating means with said switch means being time controlled by positioning the switch actuating means on the cartridge.

9. An apparatus according to claim 8, wherein said switch means are supported by said second drive means movable in reference thereto, and switch drive means coacting with said switch means to move the same toward engagement with said switch actuating means, said switch drive means being driven by said second drive means.

10. An apparatus according to claim 8 comprising further switch means and further position adjustable switch actuating means on each of said cartridges, said further switch actuating means being engageable with said further switch means, engagement of said further switch means and said further switch actuating means causing switching of said switch means and being controlled by the setting of said further switch actuating means, said further switch means being adapted to control one or several utilization devices.

11. An apparatus according to claim 1, wherein said cycling means comprise selectively operable repeat control means for effecting continuing picture projection and repetitive audible sound reproduction from a selected cartridge in the presentation station, said repeat control means including means rendering inoperative when and while being operated said cartridge return means upon completion of the tape driving operation and also rendering inoperative said first drive means thereby to prevent movement of the casing into the position of release of the next following cartridge, said means included in the repeat control means leaving operative the second drive means for movement into and out of the tape driving position and the sound head moving means for moving the sound head into and out of the position coacting with the tape of the cartridge in the presentation station.

12. An apparatus according to claim 1, wherein said cycling means comprise selectively operable skip control means for skipping picture projection and audible sound reproduction from selected cartridges, said skip control means including means rendering inoperative when and while being operated the second drive means thereby to prevent movement of the drive means into the tape driving position and also rendering inoperative the sound head moving means thereby to prevent movement of the sound head into the position coacting with the tape of a cartridge, said means included in the skip control means leaving operative the first drive means to effect movement of the casing through successive positions for releasing a cartridge for transfer to the presentation station, said cartridge return means being coupled to the second drive means to be maintained by said second drive means, when the same are rendered inoperative, in a position blocking movement of cartridges into the presentation station.

13. A cartridge for use in an apparatus as defined in claim 1, said cartridge comprising in combination:
   (a) a casing;
   (b) a tape support drum rotatably mounted within said casing and adapted to secure thereto the ends of a magnetic tape, said support drum having a peripheral tape supply sheave and a peripheral tape take-up sheave;
   (c) guide means for guiding the tape between said sheaves and including a straight tape path whereby rotation of said sheave winds tape secured to the drum from one sheave upon the other, said casing including a wall opening adjacent to said straight tape path to expose the tape while passing said path for driving of said tape by the tape driving means of the apparatus;
   (d) a coiled spring secured to said support means for tensioning said spring by and during winding of the tape from the supply sheave upon the take-up sheave whereby release of the tape when wound upon the take-up sheave rewinds the tape upon the supply sheave by spring action;
   (e) a frame portion including a picture gate for receiving a still picture to be projected; and
   releasable brake means are mounted on the support drum for arresting rotation of the drum upon completion of the rewinding of the tape upon the supply sheave.

14. A cartridge according to claim 13 wherein said brake means comprise a spring loaded brake arm biased into engagement with the drum when the tape is fully wound upon said supply sheave and being forced out of said engagement with the drum upon commencement of the winding of the tape upon the take-up sheave.

15. A cartridge according to claim 14, wherein said drum has a peripheral notch engageable with said brake arm and shaped to block turning of the drum in the unwinding direction of the take-up sheave and to guide the arm out of said notch when the drum is turned in the tape wind-up direction of the output sheave, said notch being located within the take-up sheave to cover the notch by the first turn of the tape overlying the notch thereby preventing engagement of the arm with the notch until the tape is fully rewound upon the supply sheave.

16. A cartridge according to claim 15, wherein said brake arm is linked to a link pivotally mounted on said tape drum, said arm mounting a brake shoe, said brake shoe being spring biased into frictional engagement with a wall portion of the drum when the brake arm is in engagement with said notch and is released from said engagement upon movement of the arm out of said notch.

17. A cartridge according to claim 13 and comprising a time control member adjustably supported on said cartridge casing, said member being adapted to coact with the cycling means of the apparatus, for time-controlling the tape drive by adjustment of said control member in reference to the casing.

18. A cartridge according to claim 17 and comprising at least one further control member adjustably supported on said cartridge casing, said further control member being adapted to control the operation of a utilization device by adjustment of said further control member in reference to the cartridge casing.

References Cited

UNITED STATES PATENTS

| | | | |
|---|---|---|---|
| 3,159,078 | 12/1964 | Schwartz et al. | 88—28 |
| 3,177,768 | 4/1965 | Hallamore | 88—28 |
| 3,217,595 | 11/1965 | Gallina | 88—27 |
| 3,276,314 | 10/1966 | Robinson | 88—28 |
| 3,332,319 | 7/1967 | Gerry | 88—28 |
| 3,209,647 | 10/1965 | Hall | 88—27 |
| 3,296,727 | 1/1967 | Liguori | 88—28 |
| 3,357,303 | 12/1967 | Staan | 88—28 |

NORTON ANSHER, *Primary Examiner.*

J. W. PRICE, R. M. SHEER, *Assistant Examiners.*